United States Patent
Gandhi et al.

(10) Patent No.: US 12,513,558 B2
(45) Date of Patent: Dec. 30, 2025

(54) CONFIGURATION OF MULTI-PERSONALITY ACCESS POINTS

(71) Applicant: Cisco Technology, Inc., San Jose, CA (US)

(72) Inventors: Indermeet Gandhi, San Jose, CA (US); Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 18/198,658

(22) Filed: May 17, 2023

(65) Prior Publication Data

US 2024/0388955 A1 Nov. 21, 2024

(51) Int. Cl.
H04W 28/02 (2009.01)

(52) U.S. Cl.
CPC ... *H04W 28/0263* (2013.01); *H04W 28/0205* (2013.01); *H04W 28/0289* (2013.01)

(58) Field of Classification Search
CPC ......... H04W 28/0263; H04W 28/0205; H04W 28/028
See application file for complete search history.

(56) References Cited

U.S. PATENT DOCUMENTS

| | | | |
|---|---|---|---|
| 2004/0127212 A1* | 7/2004 | Wang | H04L 43/50 455/423 |
| 2018/0123963 A1* | 5/2018 | Thubert | H04W 48/20 |
| 2021/0044498 A1* | 2/2021 | Mercian | H04L 41/5025 |
| 2021/0243247 A1 | 8/2021 | He et al. | |
| 2021/0274361 A1 | 9/2021 | Gupta et al. | |
| 2021/0390424 A1 | 12/2021 | Vo et al. | |
| 2022/0255799 A1 | 8/2022 | Singla et al. | |
| 2022/0287104 A1 | 9/2022 | Jeon et al. | |
| 2022/0377844 A1 | 11/2022 | Kumar et al. | |
| 2024/0357332 A1* | 10/2024 | Quinquis | H04L 67/06 |
| 2025/0030613 A1* | 1/2025 | Hajri | H04L 43/08 |
| 2025/0088870 A1* | 3/2025 | Park | H04W 24/02 |

* cited by examiner

*Primary Examiner* — Kibrom T Hailu
(74) *Attorney, Agent, or Firm* — Lee & Hayes, P.C.

(57) ABSTRACT

Access point devices can be equipped with Machine Learning (ML) models to improve access point device operations. An access point device operating mode can be sent to a controller. The access point device operating mode can indicate multiple network protocols employed at the access point device. The controller can provide a coarse ML model to the access point device, wherein the coarse ML model is based on the operating mode. The access point device can then use local network traffic data, processed by the access point device, to train and refine the coarse ML model, and the access point device can use the resulting trained ML model in connection with network traffic processing determinations.

20 Claims, 8 Drawing Sheets

CONFIGURATION OF MULTI-PERSONALITY ACCESS POINTS

TECHNICAL FIELD

The present disclosure relates generally to configuring edge devices such as access points that are adapted to use any of multiple different network protocols.

BACKGROUND

Access points relay wireless network traffic between a network and user devices. Access points can employ a variety of different network protocols. For example, some access points may employ Wi-Fi for downstream network communications with user devices and/or for upstream network communications with upstream network components. Other access points may use cellular communication protocols, such as fourth generation (4G) or fifth generation (5G) cellular communication protocols. Further example access points may use, e.g., Cisco ultra-reliable wireless backhaul (CURBW), or any other network protocols. Moreover, some access points can be reconfigurable, thereby allowing changes in the network protocol used by the access point.

Today's access points can also incorporate machine learning (ML) models. Benefits of employing ML models at access points include the ability to handle local data and client profiles at the network edge. Furthermore, applying ML models at the edge can provide real-time performance optimization. In addition, having ML models at the edge can also help reduce the amount of data that is transmitted back to cloud servers for processing, which can help reduce network traffic and improve overall system performance.

There are many benefits of using ML models at access points, and therefore there is a need for techniques to configure access points with appropriate ML models. However, different access points use different network protocols, as noted above, and ML models that work well with one network protocol may not work as well with a different network protocol.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
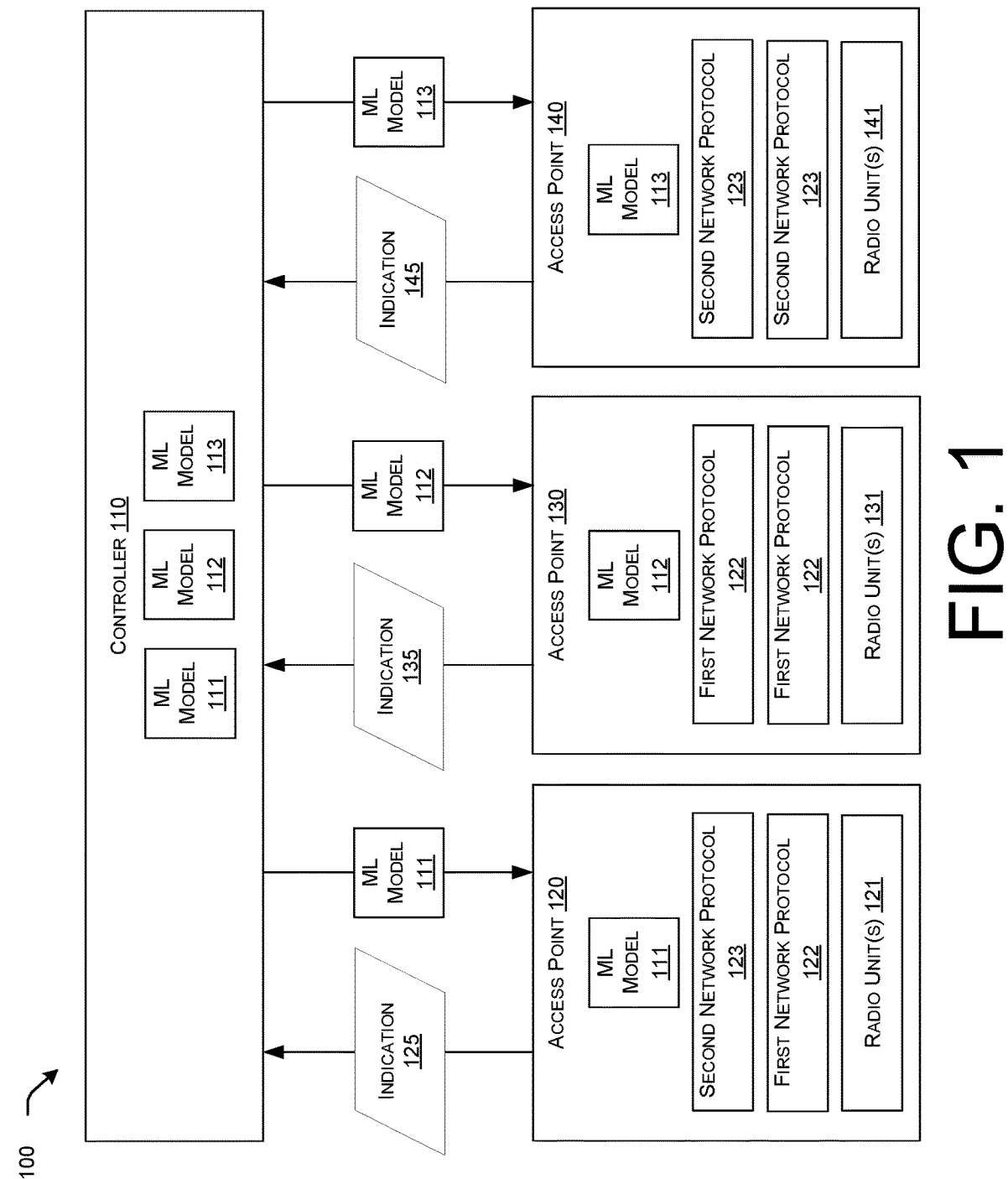
FIG. 1 illustrates an example system architecture comprising a controller equipped with multiple different ML models, wherein the controller can provide different ML models to different access points, and wherein an ML model provided to an access point is based on a combination of multiple network protocols used at the access point, in accordance with various aspects of the technologies disclosed herein.

This disclosure describes techniques for configuring "multi-personality" access points that have ML processing capabilities. Access points can be configured with different ML models, also referred to herein as models, based on a combination of network protocols used at an access point. An example access point device can be adapted to relay network traffic on behalf of user devices connected to the access point device. The access point device can comprise one or more radio units configured to communicate using a combination of multiple network protocols. The access point device can further comprise one or more processors and one or more computer-readable media storing computer-executable instructions that, when executed by the one or more processors, cause the one or more processors to perform operations. Example operations can include sending, to a controller, an indication of an operating mode applied at the access point device, wherein the operating mode comprises the combination of multiple network protocols applied at the one or more radio units. Example operations can further include receiving, from the controller, a model corresponding to the operating mode, wherein the model is usable by the access point device while the access point device is in the operating mode, in order to determine traffic control actions to perform on network traffic. Example operations can further include determining, based at least in part on analyzing the network traffic using the model, a traffic control action. Example operations can further include performing the traffic control action.

Additionally, the techniques described herein may be performed via method operations performed by the access point device described above. Furthermore, the techniques described herein may be performed via method operations performed by the controller described above. The techniques described herein may also be accomplished using non-transitory computer-readable media storing computer-executable instructions that, when executed by one or more processors, perform the methods carried out by the access point device and/or the controller.

Example Embodiments

As described herein, access point devices can be equipped to employ different operating modes, wherein different operating modes employ different combinations of multiple network protocols. For example, one access point may employ an operating mode comprising Wi-Fi+Wi-Fi. Another access point may employ an operating mode comprising Wi-Fi+5G. Another access point may employ an operating mode comprising 5G+5G. Still further access points can use further combinations of multiple network protocols, optionally including other protocols other than Wi-Fi and 5G.

Access points that use combinations of multiple network protocols can optionally comprise multiple radio units. For example, a first radio unit of an access point device can be configured to use a first network protocol, such as Wi-Fi, 5G, or another protocol, while a second radio unit of the access point device can be configured to use a second network protocol, such as Wi-Fi, 5G, or another network protocol. In another example embodiment, a single radio unit of an access point device can be configured to use combinations of multiple network protocols, e.g., the first network protocol and the second network protocol.

The techniques described herein can equip different access points with different ML models, based on an operating mode of an access point. For example, an access point with a Wi-Fi+Wi-Fi operating mode can be provided with a first ML model, an access point with a Wi-Fi+5G operating mode can be provided with a second ML model which is different from the first ML model, and an access point with a 5G+5G operating mode can be provided with a third ML model which is different from the first and the second ML models.

In order to equip different access points with different ML models, access points can be configured to interact with a controller with access to an ML model repository. In an example arrangement, an access point can send, to the controller, an indication of an operating mode applied at the access point device. The controller can identify an ML model associated with the access point's operating mode, and the controller can send the identified ML model to the access point.

The access point can receive, from the controller, the identified ML model corresponding to the access point's operating mode, and the access point can use the ML model in connection with access point operations, e.g., to determine traffic control actions to perform on network traffic processed by the access point. The access point can determine, based at least in part on analyzing the network traffic using the ML model, a traffic control action, and the access point can perform the traffic control action. The access point can optionally also use the ML model in connection with other access point operations, such as roaming determinations, traffic steering, and/or other determinations or control actions.

In some embodiments, ML models in the ML model repository can be "coarse" ML models, which can be further trained/tuned by access points based on network traffic conditions at the access points. The access points can thereby modify and refine the operations of received ML models. Access points can also optionally be configured to provide feedback data, such as performance measurements to the controller, and the controller can be configured to use the feedback data to improve coarse ML models stored in the ML model repository.

For example, an access point device can send, to the controller, a performance measurement associated with use of an ML model at the access point device, and the access point device can also send, to the controller, modification data applicable to the access point's training/modifying the ML model to improve efficacy of the ML model at the access point. The controller can optionally use the performance measurement to determine whether the modification data can be incorporated into a coarse ML model in the ML model repository, thereby improving the coarse ML model.

In some embodiments, access point devices can be configured to test the efficacy of received ML models. For example, an access point device can test the use of a received ML model in connection with local network traffic relayed by the access point device. The access point device can determine, based on a result of the testing, whether the efficacy meets a threshold efficacy. If the efficacy does not meet the threshold efficacy, then the access point device can further train/modify the ML model prior to using the ML model. If the efficacy does meet the threshold efficacy, then the access point device can optionally begin using the ML model immediately, and the access point need not necessarily further train/modify the ML model.

To enhance the processing power available for training and/or applying an ML model at an access point, access points can be configured to conduct some ML model processing and/or training operations at least in part in a kernel space, while other ML model processing and/or training operations can be conducted in a user space. The controller can optionally enable kernel space operations at access points by using, e.g., enhanced Berkeley packet filter (eBPF) technologies as described herein.

In some embodiments, the controller can be configured to also assist with training/improving ML models that have been deployed to access points. For example, when a coarse ML model is improved, e.g., by incorporation of modification data as described above, the controller can update deployed ML models in order to share the improvement with other access points that have been configured with the coarse ML model. Furthermore, in some embodiments, a controller can assist an access point in ML model training/modification by identifying other ML model modifications applied at other access points (other than the assisted access point) and providing such other ML modifications to the assisted access point. The other access points can optionally comprise neighbor or nearby access points, or similarly situated access points that are in similar network traffic conditions/topologies as the assisted access point.

For example, in some embodiments the controller can identify one or more weights applied for decision-making by an ML model deployed at a second access point and can send the identified weights to a first access point. The first access point can be configured to receive, from the controller, the identified weights for use in connection with weighted decisions applied by the ML model, wherein the identified weights comprise at least one weight copied from the second access point, and the first access point can incorporate the identified weights into its own ML model.

Should an access point device change its operating mode, e.g., from Wi-Fi+Wi-Fi to Wi-Fi+5G, or any other change of operating mode, the controller can configure the access point device with a new/different ML model, and the access point device can optionally train/modify the new/different ML model and/or perform any of the other operations described herein with respect to the new/different ML model. In an example, in response to a change of the operation mode from a first operation mode to a second operation mode, an access point device can send, to the controller, an indication of the second operating mode, wherein the second operating mode comprises a different combination of multiple network protocols applied at one or more radio units of the access point device. The controller can identify a new/different ML model (a second ML model) corresponding to the second operating mode and can send the second ML model to the access point device. The access point device can receive, from the controller, the second ML model corresponding to the second operating mode. The second ML model can be usable by the access point device while the access point device is in the second operating mode, for example to determine traffic control actions to perform on relayed network traffic.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example system architecture 100 comprising a controller 110 equipped with multiple different ML models 111, 112, 113, wherein the controller 110 can provide different ML models 111, 112, 113 to different access points 120, 130, 140, and wherein an ML model 111, 112, or 113 provided to an access point 120, 130, or 140 is based on a combination of multiple network protocols 122, 123 used at the access point 120, 130, or 140, in accordance with various aspects of the technologies disclosed herein.

FIG. 1 includes the system architecture 100, which includes the controller 110 and the access points 120, 130, 140. The controller 110 comprises ML models 111, 112, 113. The access point 120 comprises radio unit(s) 121, first network protocol 122, second network protocol 123, and ML model 111, wherein the access point 120 has received the ML model 111 from the controller 110. The access point 130 comprises radio unit(s) 131, two instances of the first network protocol 122, and ML model 112, wherein the access point 130 has received the ML model 112 from the controller 110. The access point 140 comprises radio unit(s) 141, two instances of the second network protocol 123, and ML model 113, wherein the access point 140 has received the ML model 113 from the controller 110.

In an example according to FIG. 1, the first network protocol 122 can comprise a Wi-Fi protocol, and the second network protocol 123 can comprise a 5G protocol. Therefore, the combination of multiple network protocols that defines the operating mode of the access point 120 is Wi-Fi+5G. The combination of multiple network protocols that defines the operating mode of the access point 130 is Wi-Fi+Wi-Fi. The combination of multiple network protocols that defines the operating mode of the access point 140 is 5G+5G.

The access point 120 can be configured to provide an indication 125 to the controller 110, wherein the indication 125 indicates the operating mode of the access point 120. In the illustrated example, the indication 125 indicates that the access point 120's operating mode is Wi-Fi+5G. In response, the controller 110 can identify an ML model that corresponds to the operating mode specified in the indication 125. In the illustrated example, ML model 111 corresponds to Wi-Fi+5G, and so the controller 110 can configure the access point 120 with the ML model 111.

Similarly, the access points 130, 140 can be configured to provide indications 135, 145 to the controller 110, wherein the indication 135 indicates the operating mode of the access point 130 and the indication 145 indicates the operating mode of the access point 140. In the illustrated example, the indication 135 indicates that the access point 130's operating mode is Wi-Fi+Wi-Fi, and the indication 145 indicates that the access point 140's operating mode is 5G+5G. In response, the controller 110 can identify ML model 112 for access point 130 and ML model 113 for access point 140. In the illustrated example, ML model 112 corresponds to Wi-Fi+Wi-Fi, and ML model 113 corresponds to 5G+5G. The controller 110 can provide ML models 112, 113 to the access points 130 and 140, respectively.

Figure 2:
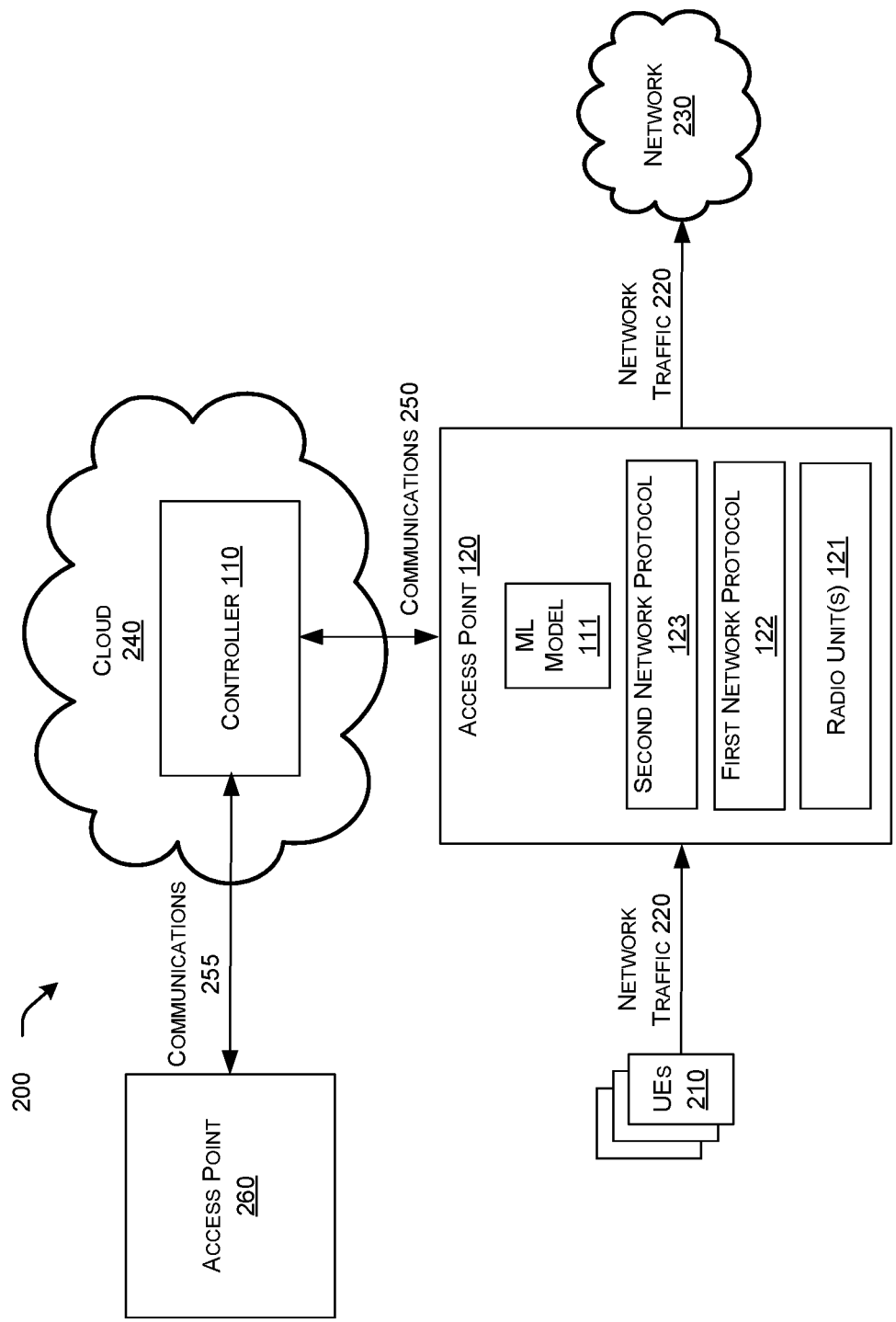
FIG. 2 illustrates an example system architecture wherein the controller introduced in FIG. 1 is located in a cloud, wherein an access point processes network traffic from user equipment (UEs), and wherein the controller furthermore interacts with another access point, in accordance with various aspects of the technologies disclosed herein.

Upon configuration with the ML models 111, 112, 113, the access points 120, 130, 140 can use the ML models 111, 112, 113 to assist with access point operations, such as directing/steering network traffic, as described further in connection with FIG. 2. Furthermore, the access points 120, 130, 140 can optionally train/modify the ML models 111, 112, 113 to customize the ML models 111, 112, 113, in order to further improve local processing functions at the access points 120, 130, 140. The access points 120, 130, 140 can optionally communicate with the controller 110 to exchange ML model modification/update information, which can be performed bidirectionally to improve the ML models 111, 112, 113 as stored at the controller 110, as well as the ML models 111, 112, 113 as stored and used at the access points 120, 130, 140.

FIG. 2 illustrates an example system architecture 200 wherein the controller 110 introduced in FIG. 1 is located in a cloud 240, wherein an access point 120 processes network traffic 220 from user equipment (UEs) 210, and wherein the controller 110 furthermore interacts with another access point 260, in accordance with various aspects of the technologies disclosed herein. FIG. 2 includes the access point 260, the cloud 240, the UEs 210, the access point 120, and a network 230. The access point 120 comprises the components introduced in FIG. 1.

In an example according to FIG. 2, the UEs 210 generate network traffic 220 which is relayed to the network 230 by the access point 120. The network traffic 220 can be configured according to any of the network protocols employed by the access point 120, e.g., according to the first network protocol 122 or the second network protocol 123. The network traffic 220 can be received from UEs 210 via radio unit(s) 121, and processed according to the network protocols 122, 123. The access point 120 can furthermore use the ML model 111 in connection with processing the network traffic 220. For example, the access point 120 can use the ML model 111 for traffic steering determinations, in order to determine network traffic 220 destinations/targets within the network 230. In another example, the access point 120 can use the ML model 111 for roaming determinations, in order to determine which of the network traffic 220 is roaming traffic. For simplicity, the network traffic 220 is illustrated as originating at the UEs 210 and terminating at the network 230, however it is understood that the network traffic 220 can be bidirectional and can therefore also include traffic flowing from the network 230 to the UEs 210.

The communications 250 between the access point 120 and the controller 110 can comprise, e.g., the indication 125 and the ML model 111 as illustrated in FIG. 1. The communications 250 can also comprise, e.g., modification data to update the ML model 111, performance data defining performance of the ML model 111 at the access point 120, or any other data pursuant to interactions described herein between the controller 110 and the access point 120.

The example additional access point 260 can comprise, e.g., another access point that also uses the ML model 111. Furthermore, the access point 260 may be determined by the controller 110 to have one or more features in common with access point 120, such as geographic proximity, network proximity, being situated in a similar network topology, or being subject to similar network traffic conditions. The communications 255 between the network controller 110 and the access point 260 can be generally similar to communications 250. In some embodiments, the controller 110 can be configured to provide ML modifications from access point 260 to access point 120, and vice versa. For example, the controller 110 can copy decision-making weights in use at access point 260, and the controller 110 can provide the copied decision-making weights to access point 120.

Figure 3:
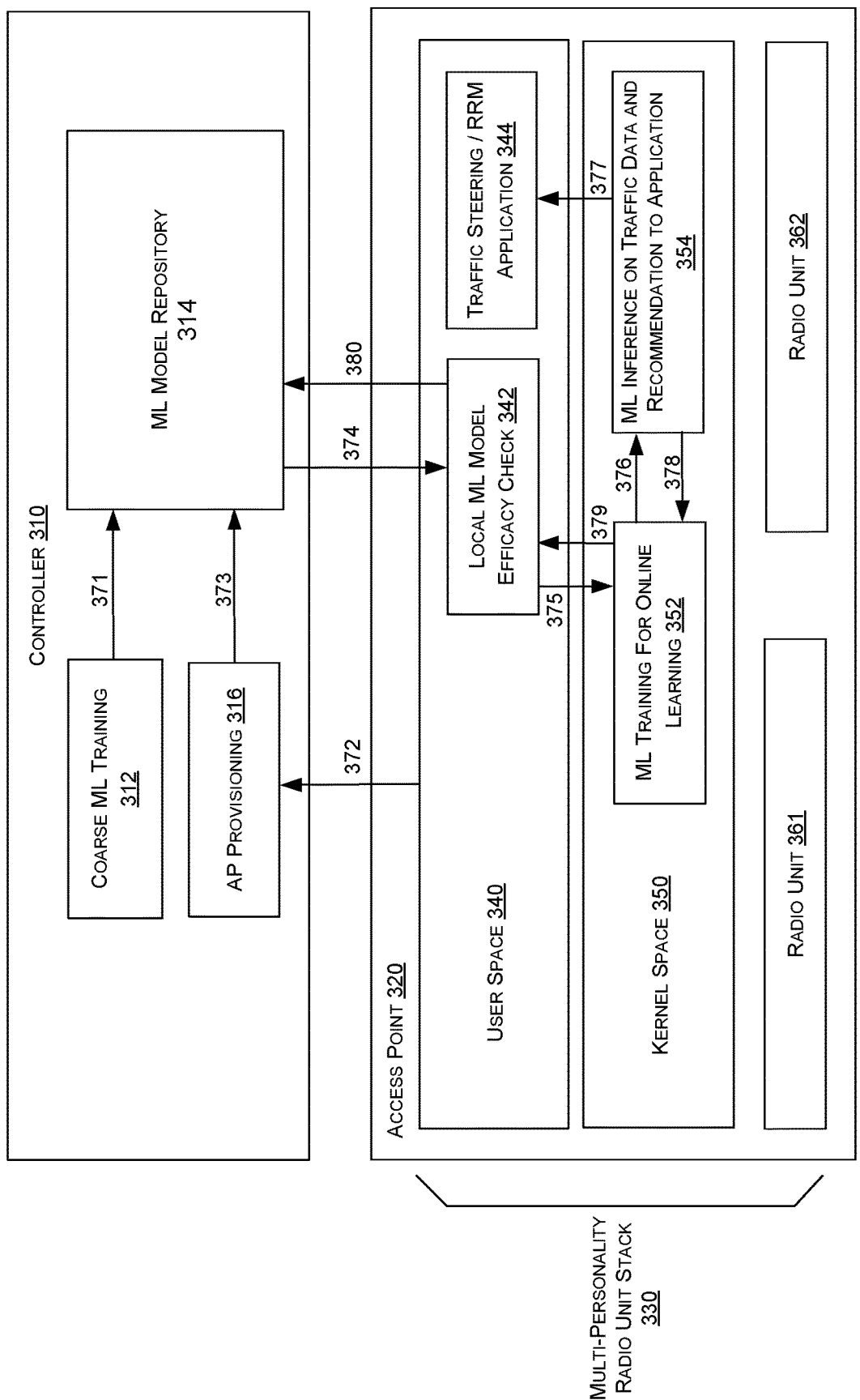
FIG. 3 illustrates example components of a controller and an access point, and example interactions therebetween, in accordance with various aspects of the technologies disclosed herein.

FIG. 3 illustrates example components of a controller 310 and an access point 320, and example interactions therebetween, in accordance with various aspects of the technologies disclosed herein. The controller 310 can implement the controller 110 in some embodiments, and the access point 320 can likewise implement any of the access points 120, 130, 140 in some embodiments.

In FIG. 3, the controller 310 comprises coarse ML training 312, ML model repository 314, and access point (AP) provisioning 316. The access point 320 comprises a multi-personality radio unit stack 330, including a user space 340, a kernel space 350, and radio units 361, 362. The user space 340 comprises local ML model efficacy check 342 and traffic steering/radio resource management (RRM) application 344. The kernel space 350 comprises ML training for online learning 352 and ML inference on traffic data and recommendation to application 344. FIG. 3 also illustrates various example interactions between the components, which are labeled as 371-380, and which are described in further detail below.

With regard to FIG. 3 in general, with the advancement of technology, chipset vendors can provide system on chip (SoC), which can not only enable radio access networks (5G and/or Wi-Fi) but also provide artificial intelligence (AI) and ML training and inference capabilities. Embodiments such as illustrated in FIG. 3 can enable a new generation of access points, which can be deployed either as 5G+5G, Wi-Fi+Wi-Fi, or as 5G+Wi-Fi in a single access point and which can include capabilities of ML based inferencing at the network's edge.

However, 5G and Wi-Fi characteristics are inherently different, and the number of endpoints in a network can vary. Further, access points can have relatively limited capability (memory, compute, etc.), which limits the number of ML models they can run at the network edge. FIG. 3 therefore provides a multi-personality radio unit controller (MPRUC), illustrated as controller 310, which is configured to distribute access specific ML models so that multi-personality wireless units, such as the access point 320, can dynamically adjust their ML model for training and inference based on their operating mode.

In some embodiments, the access point 320 can be configured to dynamically switch between supported operating modes. For example, the access point 320 can switch operating modes based on traffic load conditions, RRM logic, etc. However, because 5G and Wi-Fi radios and access networks have different underlying characteristics, different AI/ML models are useful different operating modes.

For example, a traffic steering model used for Wi-Fi only access points is different from traffic steering ML models used for Wi-Fi+5G access points. This is because in the former case, steering between two Wi-Fi radios (2.4 GHZ and 5 GHZ, or multiple 5 GHZ radios) is performed, while the latter case involves steering between the Wi-Fi+5G radios—each of which has different access characteristics. Roaming and multi-link decision making logic in 5G and Wi-Fi access are also different, hence there is a need for separate ML models depending on the access point 320's operating mode.

Further, some access points 320 can be either 5G or Wi-Fi only, with differing transmission and mobility patterns (e.g., laptops, internet of things (IoT) devices, etc.). This furthers the benefit of using access specific ML models. At the same time, these radio units can be constrained and do not have unlimited compute or memory capacity.

In view of the above considerations, wireless units and/or access points according to this disclosure can be configured to dynamically adjust their applied ML model for training and inference based on their operating mode. Embodiments deploy different ML models as needed to different access points comprising different multi-personality wireless radio units.

Turning now to the components and interactions illustrated in FIG. 3, at 371, the coarse ML training 312 can train ML models using an offline training data set and can include the coarsely trained ML models in the ML model repository 314. The ML model repository 314 can include ML models corresponding each of the different possible operating modes of the access point 320. Each ML model differs from the others. In an example, the ML models in the ML model repository 314 can include an ML model for 5G+5G, an ML model for 5G+Wi-Fi, and an ML model for Wi-Fi+Wi-Fi. The MIL models can comprise predefined input dimensions and can address and each type of operation that may be performed at the access point 320. Training of the ML models can be coarse by being based on a broader training set, but without local context from a local access point 320.

At 372, the access point 320 boots up or else changes its operating mode, and the access point 320 sends an indication of the access point 320's capability and operating mode to AP provisioning 316 at the controller 310. Example operating modes on dual-radio access points are as follows: Wi-Fi+5G, Wi-Fi+Wi-Fi, 5G+5G, CURBW+Wi-Fi, etc. The AP provisioning 316 identifies, at 373 an ML model in the ML model repository 314 and corresponding to the access point 320's operating mode. At 374, the controller 310 can deploy an identified ML model from the ML model repository 314 to the access point 320.

It is expected that some ML models may need to be refined once deployed to an access point 320, meaning ML models can be subject to further training based on local contextually relevant data. Local data is relevant to a particular environment, for example, environment factors such as building and wall structures and access point placement can have different radio frequency attenuation effects, and access points may experience different data and client profiles.

After deployment of the ML model to the access point 320 at interaction 374, the local ML model efficacy check 342 can use local data as test data to test the received ML model. The results of the test can be used to determine the efficacy of the ML model, e.g., as compared with measurements associated with original coarse training and testing sets. When the ML model is found to be below an efficacy tolerance level, then at operation 375 the access point 320 can send the ML model to ML training for online learning 352. ML training for online learning 352 can be adapted to use local data to re-train, or otherwise modify and refine, the ML model at access point 320, until the efficacy level of the ML model is improved above the efficacy tolerance level.

Generally, an ML model used at a network edge device, such as at the access point 320, should be small (e.g., a small neural network) because the access point 320 is not typically equipped with a graphics processing unit (GPU). To increase processing power available for ML model training at the access point 320, the controller 310 can be configured to create an eBPF ML function and write the eBPF ML function directly to the access point 320, so that the ML model may be trained in the kernel space 350. This has the advantage of performance improvements over deploying a generic ML model running as a separate process from the user space 340.

In some cases, access points with higher traffic may train more quickly than adjacent access points. In such cases, the controller 310 can be adapted to examine access points within proximity of the access point 320 and copy weights from access points with more advanced training to neighbor access points to help accelerate their training. In order to do so, the controller 310 can compare access points (location, client and traffic type) to determine if all or a subset of a neural network and associated weights are relevant to accelerate the training of the ML model at the access point 320. With the advantage of distributed training and inference, each access point (in its respective operating mode) can regularly update the controller 310 of each ML model's performance, efficacy, and training status. Weights of neurons and features can be adjusted in the controller 310 based on reported performance from edge access points. This allows the controller 310 to repeatedly update the ML models in the ML model repository 314, even though training and inference is happening at the edge.

In some embodiments, the access point 320 can be configured to process network traffic in the access point 320 with the use of eBPF. As with other functions that are used with eBPF, such as transmission control protocol (TCP) dump, traffic that is used to train an ML model can be replicated at the source (the access point 320) so that it can be used to train the ML model. Because the access point 320 is a constrained device, packet replication for the purpose of model training can be improved by doing this directly in the kernel space 350 rather than at higher layers, such as the user space 340. To enable this, the controller 310 can deploy a coarsely trained ML model to the access point 320 and make any kernel, eBPF, and application programming interface (API) configuration changes to facilitate these functions. Other output functions can be considered an enhancement to centrally controlled RRM functions, with an enhancement being the use of local and contextually aware ML training.

At 376, the trained ML model, trained at ML training for online learning 352, can be provided to ML inference on traffic data and recommendation to application 354. The ML inference on traffic data and recommendation to application 354 can use the ML model to make recommendations 377 to the traffic steering/RRM application 344, as the traffic steering/RRM application 344 configures a flow of network traffic through the access point 320. At 378, ML inference on traffic data and recommendation to application 354 can further provide performance feedback to the ML training for online learning 352, thereby enabled continued modification and improvement of the ML model.

At 379, ML training for online learning 352 can direct ML model modification data that reflects local modifications to the coarse ML model towards the controller 310. Performance measurements associated with the ML model modification data can optionally be made at local ML model efficacy check 342, and the ML model modification data and performance data can be sent to the controller 310 at 380.

Although the description here focuses on coarse model training, the techniques described herein can also be used in connection with an inference model after an ML model is trained. Furthermore, if the access point 320 switches operating mode by switching radio functions in the access point 320, the access point 320 can be configured to notify the controller 310 of the change (e.g., 5G to Wi-Fi, or Wi-Fi to 5G). In response, the controller 310 can be configured to provide a different ML model to the access point 320, and the techniques described herein can be repeated for the different ML model.

Figure 4:
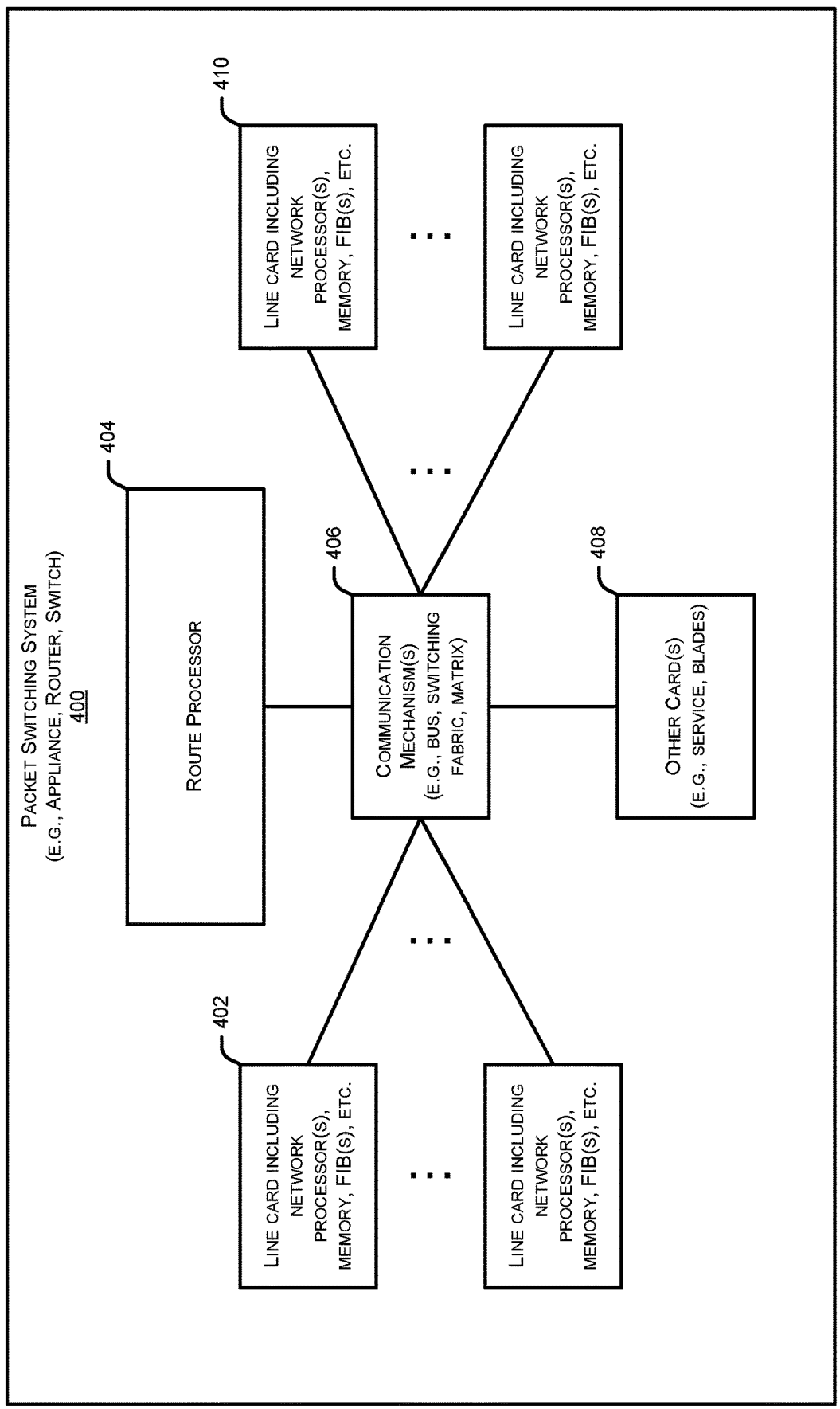
FIG. 4 illustrates an example packet switching system that can be utilized to implement an access point device, in accordance with various aspects of the technologies disclosed herein.

FIG. 4 illustrates an example packet switching system 400 that can be utilized to implement an access point device, in accordance with various aspects of the technologies disclosed herein. In some examples, the packet switching system 400 can be implemented as one or more packet switching device(s). The packet switching system 400 may be employed in a network, such as, for example, the LAN 105 illustrated in FIG. 1, to process network traffic by receiving and forwarding packets. The illustrated elements of the packet switching system 400 can include, e.g., components introduced in any of FIGS. 1-3 to configure the packet switching system 400 to perform operations according to this disclosure.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 404 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching system 400 may comprise a communication mechanism 406 (e.g., bus, switching fabric, and/or matrix, etc.) for allowing the different entities 402, 404, 408 and 410 to communicate. The communication mechanism 406 can optionally be hardware-based. Line card(s) 402, 410 may perform the actions of being both an ingress and/or an egress line card 402, 410, with regard to multiple packets and/or packet streams being received by, or sent from, the packet switching system 400.

Figure 5:
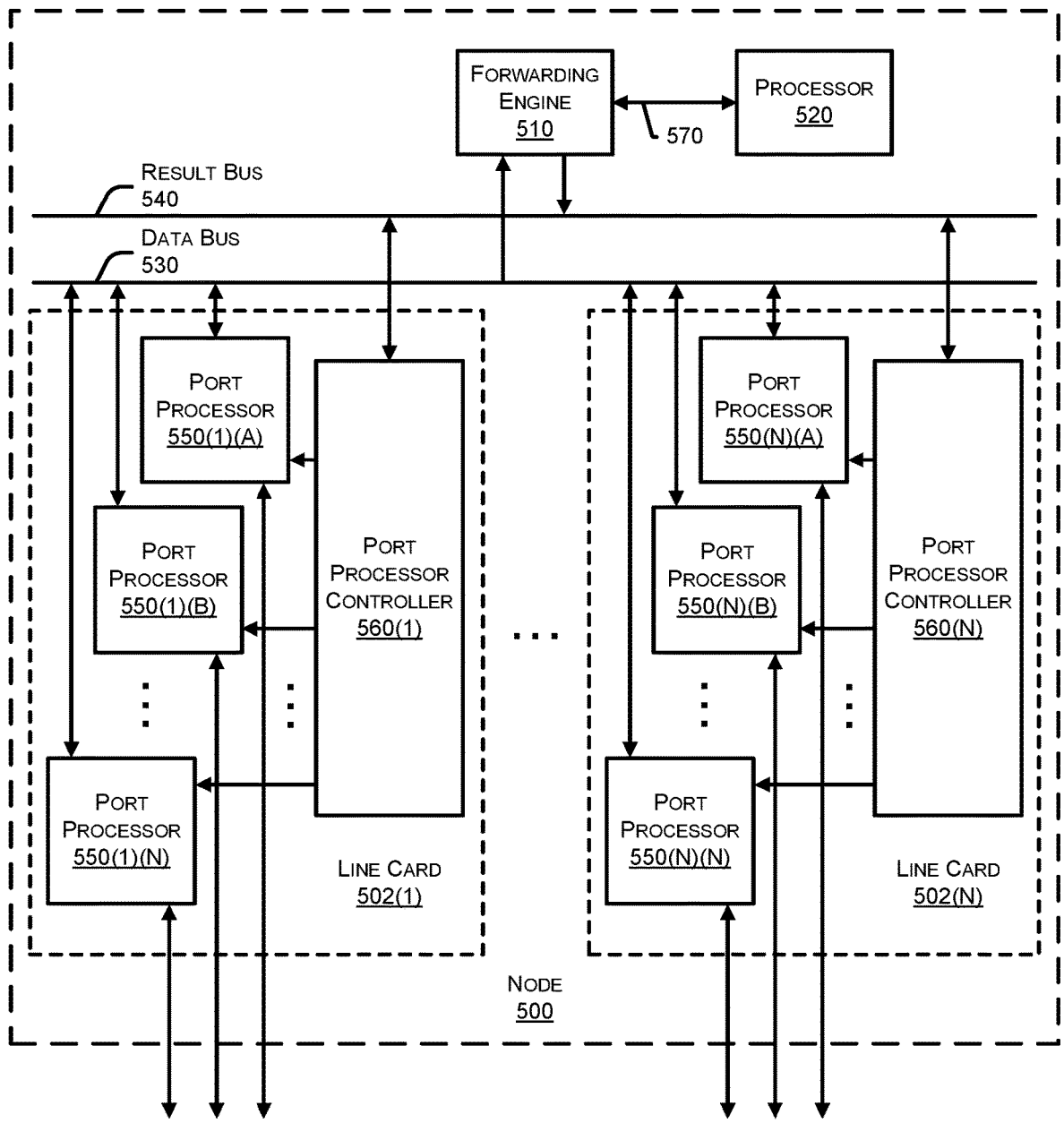
FIG. 5 illustrates an example node that can be utilized to implement an access point device, in accordance with various aspects of the technologies disclosed herein.

FIG. 5 illustrates an example node 500 that can be utilized to implement an access point device, in accordance with various aspects of the technologies disclosed herein. In some examples, node 500 may include any number of line cards 502, e.g., line cards 502(1)-(N), where N may be any integer greater than 1, and wherein the line cards 502 are communicatively coupled to a forwarding engine 510 (also referred to as a packet forwarder) and/or a processor 520 via a data bus 530 and/or a result bus 540. Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively. Additionally, or alternatively, the forwarding engine 510 and/or the processor 520 can be coupled to one another via the data bus 530 and the result bus 540, and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510. For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
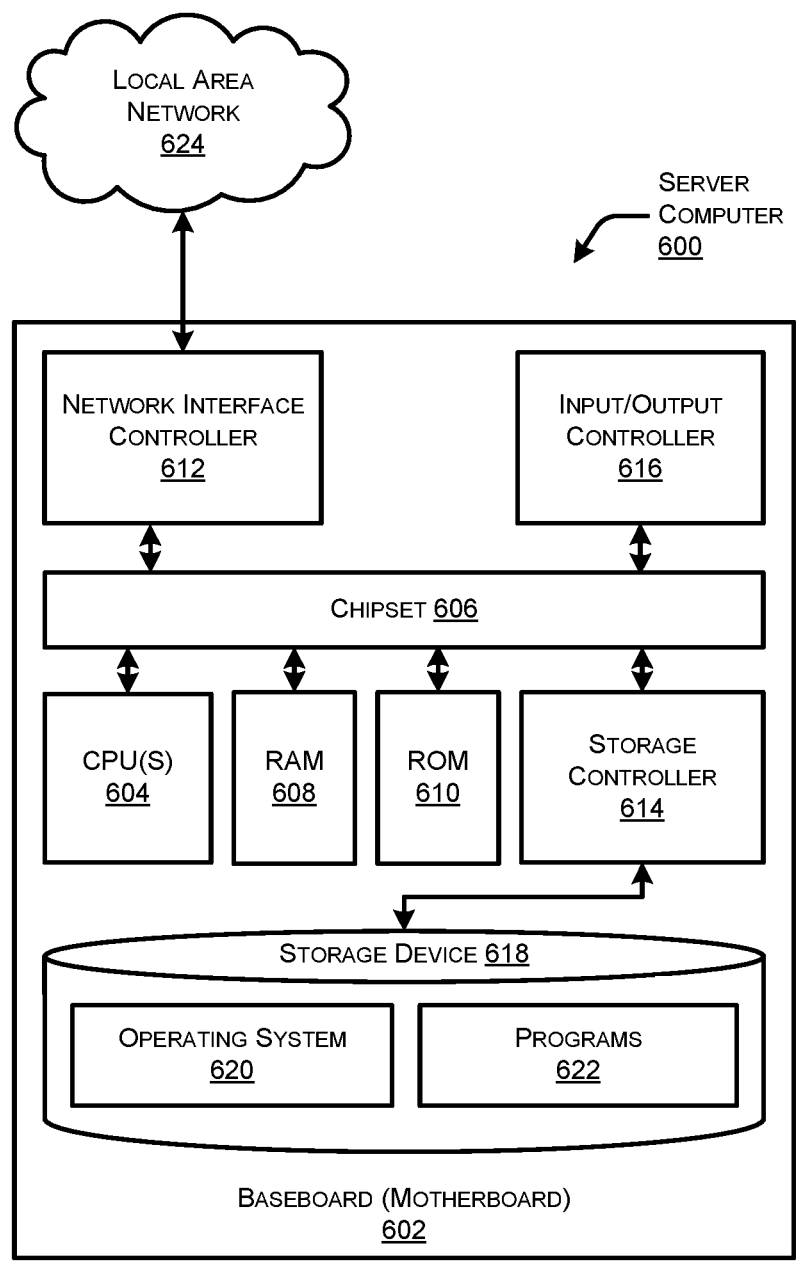
FIG. 6 illustrates an example computer hardware architecture that can implement a server device that can host a controller, in accordance with various aspects of the technologies disclosed herein.

FIG. 6 illustrates an example computer hardware architecture that can implement a server computer 600 that can host a controller, in accordance with various aspects of the technologies disclosed herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a device that can host a controller 110 or 310, described herein with respect to FIGS. 1 and 3, respectively.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the network 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIG. 1, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described above with regard to FIGS. 7-8. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a key board, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
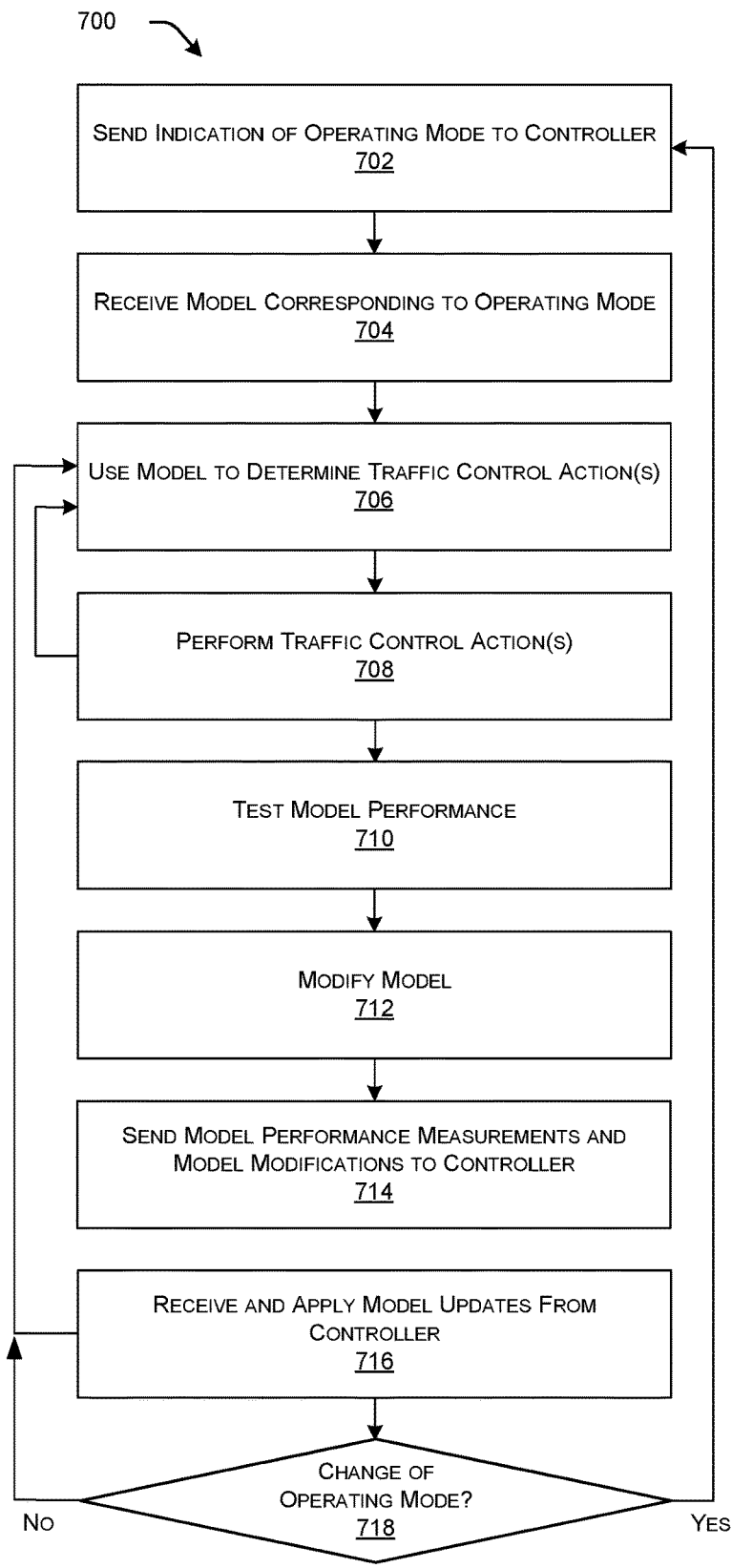
FIG. 7 is a flow diagram that illustrates an example method performed by an access point device, in accordance with various aspects of the technologies disclosed herein.
Figure 8:
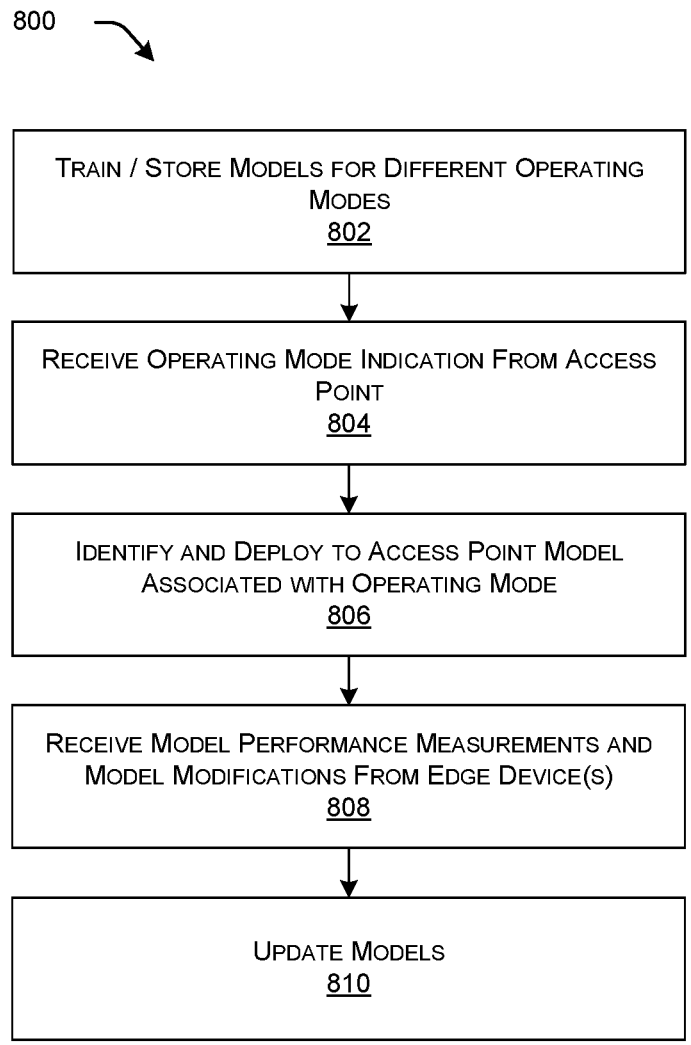
FIG. 8 is a flow diagram that illustrates an example method performed by a controller, in accordance with various aspects of the technologies disclosed herein.

FIGS. 7-8 illustrate flow diagrams of example methods 700, 800 performed at least partly by an access point 120 and a controller 110, respectively. The logical operations described herein with respect to FIGS. 7-8 may be implemented (1) as a sequence of computer-implemented acts or program modules running on a computing system and/or (2) as interconnected machine logic circuits or circuit modules within the computing system. In some examples, the methods 700, 800 may be performed by a system comprising one or more processors and one or more non-transitory computer-readable media storing computer-executable instructions that, when executed by the one or more processors, cause the one or more processors to perform the methods 700, 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method 700 performed by an access point device, e.g., the access point device 120 illustrated in FIGS. 1 and 2, in accordance with various aspects of the technologies disclosed herein. At 702, the access point device 120 can send an indication 125 of its operating mode to the controller 110. The indication 125 identifies an operating mode applied at the access point device 120, wherein the operating mode comprises a combination of multiple network protocols 122, 123 applied at one or more radio units 121 of the access point device 120. For example, the combination of multiple network protocols 122, 123 can be selected from a group comprising a Wi-Fi plus Wi-Fi combination, a Wi-Fi plus 5G wireless combination, and a 5G wireless plus 5G wireless combination.

At 704, the access point device 120 can receive a model, such as ML model 111, corresponding to its operating mode. The model 111 can be received from the controller 110, and, at 706, so long as the access point device 120 is in the operating mode corresponding to the indication 125, the access point device 120 can use the model 111 to determine traffic control action(s) to perform on network traffic 220. At 708, the access point device 120 can perform the traffic control action(s) determined at block 706. The traffic control action(s) can comprise, e.g., traffic steering actions, roaming determinations, or any other traffic control actions. The access point device 120 can continue to use the model 111 at blocks 706-708, while optionally also testing, training, and updating the model 111 according to blocks 710-716. In some embodiments, the access point can be configured to apply blocks 706-708 after testing, training, and updating the model 111 according to blocks 710-716, in order to reach a threshold level of model 111 performance/efficacy.

At 710, the access point device 120 can test model 111 performance, e.g., by testing the efficacy of the model 111 in connection with local network traffic 220 relayed by the access point device 120. In some embodiments, the access point device 120 can optionally determine, based on a result of the testing pursuant to 710, that the efficacy does not meet a threshold efficacy, and modifying the model 111 at block 712 can be performed in response to the determining that the efficacy does not meet the threshold efficacy. In other embodiments, the access point device 120 can train/modify the model 111 regardless of the model 111's initial efficacy.

In some embodiments, training/modifying the model 111 at 712 can be performed in a kernel space of the access point device 120. For example, the access point device 120 can comprise a kernel space and a user space such as illustrated in FIG. 3. Modifying the model 111 can comprise one or more model 111 training operations executed in the kernel space. The kernel space can optionally be equipped, from the controller 110, with a kernel space module configured to perform a kernel space process to modify the model 111. The kernel space module can comprise, e.g., an extended Berkeley packet filter (eBPF) module. The access point device 120 can execute the kernel space module in order to train/modify the model 111.

At 714, the access point device 120 can send to the controller 110 performance measurement(s) associated with use of the model 111 at the access point device 120, as well as modification data applicable to the modifying the model 111 in order to improve an efficacy of the model 111 at the access point device 120. The controller 110 can optionally use the performance measurement(s) and modification data to update the model 111 as stored at that controller 110.

At 716, the access point device 120 can receive and apply model updates from the controller 110. For example, the access point device 120 can receive one or more weights for use in connection with weighted decisions applied by the model 111, wherein the one or more weights comprise at least one weight copied from another access point device 260. The access point device 120 can return to operation 706, thereby using the updated model 111 for traffic control action(s).

At 718, the access point device 120 can notify the controller 110 in response to a change of the operation mode at the access point device 120, thereby causing the process to begin again at block 702. For example, in response to a change of the operation mode from a first operation mode to a second operation mode the access point device 120 can send to the controller 110 at 702 an indication of the second operating mode, wherein the second operating mode comprises a different combination of multiple network protocols applied at the one or more radio units 121. The different combination of protocols can be, e.g., 122, 122, or 123, 123). In response to the updated indication, the controller 110 can send a different model, e.g., 112 or 113, to the access point device 120. At block 704, the access point device 120 can receive from the controller 110 a second model corresponding with the second operating mode, wherein the second model is usable by the access point device 120 while the access point device 1209 is in the second operating mode, in order to determine traffic control actions to perform on the network traffic 220.

FIG. 8 is a flow diagram that illustrates an example method performed by a controller, e.g., the controller 110 illustrated in FIGS. 1 and 2, in accordance with various aspects of the technologies disclosed herein. At 802, the controller 110 can train/store models for different access point operating modes, e.g., ML models 111, 112, and 113. In some embodiments, the controller 110 can perform a coarse training that need not be tuned for particular local traffic circumstances. Once the models 111, 112, and 113 are coarsely trained to a first level of operating efficiency, the models 111, 112, 113 can be stored in an ML model repository.

At 804, the controller 110 can receive an operating mode indication, e.g., indication 125, from an access point 120. In an example, the indication 125 can indicate a combination of multiple network protocols, wherein the combination is selected from a group comprising a Wi-Fi plus Wi-Fi combination, a Wi-Fi plus 5G wireless combination, and a 5G wireless plus 5G wireless combination.

At 806, the controller 110 can identify and deploy to the access point 120 a model 111 associated with the operating mode, e.g., the operating mode indicated in indication 125. The controller 110 can retrieve an updated version of the model 111 from the ML model repository, and the controller 110 can send data representative of the model 111 to the access point 120. If the model 111 is to be trained and/or run in access point 120's kernel space, the controller 110 can be adapted to configure the access point 120's kernel space, e.g., by configuring an eBPF function or module for the access point 120's kernel space.

At 808, the controller 110 can receive performance measurements and model 111 modifications from the access point 120 or from other edge device(s) that are also running the model 111, such as access point 260. At 810, the controller 110 can update models, e.g., by updating a model 111 as stored at the controller 110 and/or by updating a deployed model, such as the model 111 at the access point 120. Operations 808 and 810 can optionally be implemented in embodiments that leverage the controller 110 for centralized model improvements. Some embodiments can omit the use of the controller 110 at operations 808 and 810, e.g., by performing model training at the edge only without the involvement of the controller 110, or by implementing a federated/distributed model training process that omits the involvement of the controller 110, or by using another server or process, other than the controller 110, for model improvement sharing.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An access point device adapted to relay that relays network traffic on behalf of user devices connected to the access point device, the access point device comprising:
one or more radio units configured to communicate using a combination of multiple network protocols;
one or more processors;
one or more computer-readable media storing computer-executable instructions that, when executed by the one or more processors, cause the one or more processors to perform operations comprising:
sending, to a controller, an indication of an operating mode applied at the access point device, wherein the operating mode comprises the combination of multiple network protocols applied at the one or more radio units;

receiving, from the controller, a model corresponding to the operating mode, wherein the model is usable by the access point device while the access point device is in the operating mode, in order to determine traffic control actions to perform on network traffic;

determining, based at least in part on analyzing the network traffic using the model, a traffic control action; and performing the traffic control action.

2. The access point device of claim 1, wherein the combination of multiple network protocols is selected from a group comprising a Wi-Fi plus Wi-Fi combination, a Wi-Fi plus fifth generation (5G) wireless combination, and a 5G wireless plus 5G wireless combination.

3. The access point device of claim 1, wherein the operations further comprise modifying the model at the access point device.

4. The access point device of claim 3, wherein the operations further comprise:
testing an efficacy of the model in connection with local network traffic relayed by the access point device; and
determining, based on a result of the testing, that the efficacy does not meet a threshold efficacy,
wherein the modifying the model is in response to the determining that the efficacy does not meet the threshold efficacy.

5. The access point device of claim 3, wherein the access point device comprises a kernel space and a user space, and wherein modifying the model comprises one or more model training operations executed in the kernel space.

6. The access point device of claim 3, wherein the operations further comprise:
sending, to the controller, a performance measurement associated with use of the model at the access point device; and
sending, to the controller, modification data applicable to the modifying the model in order to improve an efficacy of the model at the access point device.

7. The access point device of claim 1, wherein the operations further comprise receiving, from the controller, one or more weights for use in connection with weighted decisions applied by the model, wherein the one or more weights comprise at least one weight copied from another access point device.

8. The access point device of claim 1, wherein the operations further comprise:
in response to a change of the operation mode from a first operation mode to a second operation mode, sending, to the controller, an indication of the second operating mode, wherein the second operating mode comprises a different combination of multiple network protocols applied at the one or more radio units; and
receiving, from the controller, a second model corresponding with the second operating mode, wherein the second model is usable by the access point device while the access point device is in the second operating mode, in order to determine traffic control actions to perform on the network traffic.

9. The access point device of claim 1, wherein the traffic control action comprises a traffic steering action or a roaming determination.

10. A method comprising:
sending, to a controller, an indication of an operating mode applied at an access point device, wherein the operating mode comprises a combination of multiple network protocols applied at one or more radio units of the access point device;

receiving, from the controller, a model corresponding to the operating mode, wherein the model is usable by the access point device while the access point device is in the operating mode, in order to determine traffic control actions to perform on network traffic;

determining, based at least in part on analyzing the network traffic using the model, a traffic control action; and performing the traffic control action.

11. The method of claim 10, wherein the combination of multiple network protocols is selected from a group comprising a Wi-Fi plus Wi-Fi combination, a Wi-Fi plus fifth generation (5G) wireless combination, and a 5G wireless plus 5G wireless combination.

12. The method of claim 10, further comprising modifying the model at the access point device.

13. The method of claim 12, further comprising:
testing an efficacy of the model in connection with local network traffic relayed by the access point device; and
determining, based on a result of the testing, that the efficacy does not meet a threshold efficacy,
wherein the modifying the model is in response to the determining that the efficacy does not meet the threshold efficacy.

14. The method of claim 12, wherein the access point device comprises a kernel space and a user space, and wherein modifying the model comprises one or more model training operations executed in the kernel space.

15. The method of claim 12, further comprising:
sending, to the controller, a performance measurement associated with use of the model at the access point device; and
sending, to the controller, modification data applicable to the modifying the model in order to improve an efficacy of the model at the access point device.

16. The method of claim 10, further comprising receiving, from the controller, one or more weights for use in connection with weighted decisions applied by the model, wherein the one or more weights comprise at least one weight copied from another access point device.

17. The method of claim 10, further comprising:
in response to a change of the operation mode from a first operation mode to a second operation mode, sending, to the controller, an indication of the second operating mode, wherein the second operating mode comprises a different combination of multiple network protocols applied at the one or more radio units; and
receiving, from the controller, a second model corresponding with the second operating mode, wherein the second model is usable by the access point device while the access point device is in the second operating mode, in order to determine traffic control actions to perform on the network traffic.

18. The method of claim 10, wherein the traffic control action comprises a traffic steering action or a roaming determination.

19. A method comprising:
sending, to a controller, an indication of an operating mode applied at an access point device,
wherein the operating mode comprises a combination of multiple network protocols applied at one or more radio units of the access point device,
receiving, from the controller, a model corresponding to the operating mode, wherein the model is usable by the access point device while the access point device is in the operating mode, in order to determine traffic control actions to perform on network traffic;

receiving, from the controller, a kernel space module that enables a kernel space process to modify the model;

executing, in a kernel space of the access point device, the kernel space module in order to perform the kernel space process to modify the model, resulting in a modified model;

determining, based at least in part on analyzing the network traffic using the modified model, a traffic control action; and performing the traffic control action.

20. The method of claim 19, wherein the kernel space module comprises an extended berkeley packet filter (eBPF) module.

\* \* \* \* \*